(12) United States Patent
Savic et al.

(10) Patent No.: US 9,386,779 B2
(45) Date of Patent: Jul. 12, 2016

(54) TUBULAR FILM FOOD CASING

(71) Applicant: PODANFOL S.A., Chodziez (PL)

(72) Inventors: Zoran Savic, Vienna (AT); Olaf Wozniak, Chodziez (PL)

(73) Assignee: PODANFOL S.A., Chodziez (PL)

( * ) Notice: Subject to any disclaimer, the term of this patent is extended or adjusted under 35 U.S.C. 154(b) by 238 days.

(21) Appl. No.: 13/871,151

(22) Filed: Apr. 26, 2013

(65) Prior Publication Data

US 2014/0322393 A1    Oct. 30, 2014

(51) Int. Cl.
*A22C 13/00* (2006.01)

(52) U.S. Cl.
CPC ..... *A22C 13/0013* (2013.01); *A22C 2013/0046* (2013.01); *A22C 2013/0059* (2013.01); *A22C 2013/0083* (2013.01); *A22C 2013/0089* (2013.01); *Y10T 428/1324* (2015.01)

(58) Field of Classification Search
CPC ............... A22C 13/00; A22C 13/0013; A22C 2013/002; A22C 2013/0046; A22C 2013/0053; A22C 2013/0059; A22C 2013/0063; A22C 2013/0066; A22C 2013/0073; A22C 2013/83; A22C 2013/0089; Y10T 428/1324

USPC .............. 428/34.1, 34.2, 34.3, 34.8; 426/105, 426/106; 264/500, 510, 512, 514, 164, 264/171.1, 171.26, 196.1, 209.1
See application file for complete search history.

(56) References Cited

U.S. PATENT DOCUMENTS

| | | |
|---|---|---|
| 2004/0062889 A1 | 4/2004 | Borodaev et al. |
| 2004/0191368 A1 | 9/2004 | Mori et al. |
| 2005/0106294 A1 | 5/2005 | Stalberg et al. |
| 2005/0163948 A1 | 7/2005 | McGarel |
| 2006/0051466 A1 | 3/2006 | Delius et al. |
| 2006/0147661 A1 | 7/2006 | Tobben et al. |
| 2007/0054013 A1 | 3/2007 | Schiffmann |

FOREIGN PATENT DOCUMENTS

| | | |
|---|---|---|
| WO | WO 02/054878 A1 | 7/2002 |
| WO | WO 02/085129 A1 | 10/2002 |
| WO | WO 2004/065466 A1 | 8/2004 |
| WO | WO 2004/103079 A1 | 12/2004 |
| WO | WO 2006/112753 A2 | 10/2006 |

OTHER PUBLICATIONS

Extended European Search Report, dated Sep. 13, 2013, for European Application No. 13165479.0.

*Primary Examiner* — Michael C Miggins
(74) *Attorney, Agent, or Firm* — Birch, Stewart, Kolasch & Birch, LLP

(57) ABSTRACT

The present invention relates to a tubular film food casing, a process for its production and a food product comprising the tubular film food casing.

14 Claims, No Drawings

TUBULAR FILM FOOD CASING

The present invention relates to a tubular film food casing, a process for its production and a food product comprising the tubular film food casing.

Biopolymer-based casings such as cellulose, cellulose-fibrous, collagen and natural casings (animal casings) are mainly used for the production of smoked, cooked, semi-dry, raw and dry sausages and other foodstuffs with a permeability to allow either penetration of smoke and/or exchange of gases and water vapor loss which leads to drying; this selective permeability is the basic characteristic of bio-polymers and was not matched by synthetic polymer-man made casings until the turn of the century.

Only after 2000, semi-permeable polyamide-based casings highly modified with other polymers and made permeable to water vapor and/or smoke have been appearing on the markets worldwide. The food processing industry is increasingly interested to tune their products in novel casings and therefore a number of patent applications have been appearing in this field in the last decade.

WO 2004/065466 describes a smoke-permeable, biaxially oriented food envelope containing at least one aliphatic (co) polyamide and at least one water-soluble synthetic polymer, and having a water-vapor permeability of between 20 and 200 $g/m^2$ d. The water-soluble polymer is preferably a polyvinyl alcohol. This patent describes a casing which is preferably used as an artificial sausage casing especially for production of sausages which can be smoked.

US-A-2004/0062889 describes a single-layer smoke permeable casing which is produced on the base matrix of an aliphatic polyamide and/or copolyamide and/or terpolyamide and contains 4.5-50.0 wt.-% of a hydrophilic compound which is in a highly dispersed state, wherein the hydrophilic compound forms a disperse phase with a linear size of the domain being 0.1-3 μm in a direction perpendicular to the plane of the film, and further contains either a polymer compound or a low molecular substance salt.

WO 2002/085129 refers to a smokeable casing comprising a mixture of polyamide and polyvinylpyrrolidone in a ratio of 50 to 99:50 to 1 by weight and 80 to 99:20 to 1 by weight. The polyamide itself is nylon 6 or copolymer of nylon 6 and nylon 6.6.

US-A-2005/0163948 discloses a monolayer film or tube used as food casing with a blend of aliphatic polyamides and a novel polyvinyl alcohol and optionally an antiblocking agent. The structure of the novel polyvinyl alcohol is described in detail whereby its concentration is 15 to 45 wt.-% and that of the aliphatic polyamide is 55 wt.-% to 85 wt.-%. Optionally the chosen antiblock agent may be added in an amount of from 3 to 5 wt.-%.

EP-A-1 626 626 discloses a casing made at least of one polyamide (40 to 70 wt.-%), a portion of polyvinyl alcohol (5 to 40 wt.-%) and a portion of PEBA (polyether block amide) in a concentration of from 20 to 30 wt.-%.

The object underlying the present invention is to create a semi-permeable food casing based on synthetic polymers which achieves the following characteristics: water-vapor loss (weight loss during cooking or ripening/drying/storage), permeability to smoke at different temperature ranges (20° C.-72° C.), haptic and visual appearance of natural fabrics, adjustable adhesion to meat and therefore custommade peelability, coloring without involving the food contact layer and economical production costs.

The object is achieved according to the present invention by a tubular film food casing, which is semi-permeable to smoke and water-vapor, comprising at least one layer (1), comprising a mixture of at least one semi-aromatic (co)polyamide with at least one water-soluble synthetic organic polymer and optionally at least one plastifier.

Furthermore, the object is achieved by a process for producing the tubular film food casing by (co)extruding the mixtures forming the at least one layer (1) and optionally further layers.

The object is furthermore achieved by a food product, comprising a tubular film food casing as defined above, filled with a solid or paste-like foodstuff.

According to the present invention it has been found that a semi-aromatic (co)polyamide can be advantageously employed in a tubular film food casing. The semi-aromatic (co)polyamide, when combined with at least one water-soluble synthetic organic polymer, can provide for an advantageous semi-permeable property profile leading to a semi-permeability to smoke and water-vapor.

The tubular film food casing can be smoked at different temperatures, preferably in the range of from 20 to 72° C. Furthermore, the haptic and visual appearance resembles that of natural fabrics. The adhesion to meat and other foodstuff contained in the casing can be adjusted by adjusting the composition of the innermost layer of the tubular film food casing, so that the peelability can be adjusted to the specific contained foodstuff.

By employing semi-aromatic polyamides in the tubular film food casing, a number of advantages can be achieved:

Excellent mechanical properties, versatility of available semi-aromatic polyamides to achieve required flexibility and thus twistability of thin films required in the meat industry and relatively low melting points of some semi-aromatic polyamides allowing forming blends of lower processing temperature profile to facilitate extrusion of heat-sensitive water-soluble polymers like polyvinyl alcohol (PVOH). This is the reason why layers with semi-aromatic polyamides can contain other polymers with low temperature processability. Possible additional layers with aliphatic polyamides can contain heat-resistant polymers such polyvinylpyrrolidone. The combination of those properties in a multi-layer structure, with a possible variation of layer thicknesses of such polymer blends, creates new properties needed for production of many cooked/smoked and semi-dry meat, cheese and other foodstuff products.

In order to achieve these properties the usage of semi-aromatic polyamides, especially those with melting points ranging from 150° C. to 212° C., is an important element of the solution. The combination of those semi-aromatic polyamide types allows not only extrusion at low temperatures needed to process polyvinyl alcohol but also allows for low film thicknesses with very satisfactory mechanical properties needed to suit many demands of the meat industry: stretchability, twistability (for linking processes), puncture resistance and curvability (friendly ringing process for naturally looking sausages resembling natural casing beef runners).

According to the present invention, semi-aromatic (co) polyamides are employed in the at least one layer (1) of the tubular film food casing. The term (co)polyamides encompasses polyamides and copolyamides. Semi-aromatic (co) polyamides contain aromatic units in the polymer chain. In a polyamide formed of dicarboxylic acid and diamine units, the aromatic units can be present in the dicarboxylic acid and/or diamine units. Preferably, they are present in the dicarboxylic acid units. More preferably, the dicarboxylic acid units comprise isophthalic acid or terephthalic acid units. The term "semi-aromatic" defines that not all monomer building blocks of the polyamides are aromatic. Therefore, besides aromatic dicarboxylic acids or diamines, aliphatic dicarboxylic acids or diamines can be employed. Therefore, the polyamide has units or building blocks derived from aromatic compounds and non-aromatic compounds.

If only one type of dicarboxylic acid and diamine is employed in the production of the polyamide, it is a polyamide. If comonomers are employed, e. g. different types of dicarboxylic acids and/or diamines, a copolyamide results.

The copolyamides can also contain units derived from lactams like caprolactams or from aminocarboxylic acids.

The amount of aromatic monomeric units (dicarboxylic acids or diamines) contained in the (co)polyamide, based on the total amount of dicarboxylic acids or diamines, is preferably 1 to 100 wt.-%, more preferably 5 to 50 wt.-%.

Suitable semi-aromatic (co)polyamides can be obtained from different sources. Examples are ISO 1874-PA 6/IPDI, FS 18-020 (Durethan® C 38 FA of Lanxess), ISO 1874: PA 6/PA 6I, FT, 14-030 (Durethan® Cl 31, F of Lanxess), copolyamides BM 16 and BM 17 of EMS-Chemie.

Semi-aromatic (co)polyamides which are advantageously employed according to the present invention have a melting point in the range of from 150 to 212° C.

According to a preferred embodiment, this at least one layer (1) does not comprise aliphatic (co)polyamides.

The at least one layer (1) comprises a mixture of at least one of these semi-aromatic (co)polyamides with at least one water-soluble synthetic organic polymer and optionally at least one plastifier.

The amount of semi-aromatic (co)polyamide based on the at least one layer (1) is preferably in the range of from 10 to 90 wt.-%, more preferably 30 to 70 wt.-%, in particular 50 to 60 wt.-%.

The amount of the at least one water-soluble synthetic organic polymer is preferably in the range of from 5 to 60 wt.-%, more preferably in the range of 15 to 50 wt.-%, in particular in the range of from 25 to 35 wt.-%.

The amount of the at least one plastifier is preferably in the range of from 0 to 30 wt.-%, more preferably in the range of from 0 to 20 wt.-%, in particular in the range of from 0 to 10 wt.-%. If the plastifier is present, its minimal amount is preferably 0.5 wt.-%, more preferably 1.0 wt.-%, in particular at least 2 wt.-%.

The amounts of all ingredients of the at least one layer (1) add up to 100 wt.-%. If only semi-aromatic (co)polyamides, water-soluble synthetic organic polymers (and optionally plastifiers) are present, the sum of their amounts adds up to 100 wt.-%.

The water-soluble, synthetic, organic polymer is preferably selected from the group consisting of
(i) a partially or completely saponified poly(vinyl alcohol),
(ii) a copolymer having vinyl alcohol units,
(iii) a poly(alkylene glycol),
(iv) a copolymer having alkylene glycol units,
(v) a polyvinylpyrrolidone,
(vi) a copolymer having vinylpyrrolidone units and units of at least one α,β-olefinically unsaturated monomer,
(vii) a homopolymer or a copolymer having units of N-vinylalkylamides and/or
(viii) a (co)polymer of or polymer having units of α,β-unsaturated carboxylic acids or α,β-unsaturated carboxamides.

One of these organic polymers can be employed, however, also combinations of two or more of these organic polymers or within each of these groups of these polymers can be employed.

The water-soluble, heat-plasticizable, synthetic, organic polymer is preferably a) a poly(vinyl alcohol) (PVAL), as obtainable by partial or complete saponification of poly(vinyl acetate) (PVAC), or a copolymer having vinyl alcohol units (for example a copolymer having units of vinyl alcohol and propen-1-ol), b) a poly(alkylene glycol), in particular poly (ethylene glycol), polypropylene glycol) or a corresponding copolymer having alkylene glycol units, in particular ethylene glycol and/or propylene glycol units, and units of other monomers, c) a polyvinylpyrrolidone or a water-soluble copolymer having vinylpyrrolidone units and units of at least one [alpha],[beta]-olefinically unsaturated monomer, d) a polymer of N-vinylalkylamides, e. g. poly(N-vinylformamide), poly(N-vinylacetamide) or e) a (co-)polymer of or comprising units of α,β-unsaturated carboxylic acids or α,β-unsaturated carboxamides, in particular with units of (meth) acrylic acid and/or (meth)acrylamide. Of these groups, a) is particularly preferred. Very particular preference is given to a PVAL having a mean molecular weight MW of 10,000 to 50,000 and a degree of saponification of the acetate groups in the range 75 to 98%.

Preferably, the at least one layer (1) comprises at least two different water-soluble synthetic organic polymers.

More preferably, the at least one layer (1) comprises a partially or completely saponified poly(vinyl alcohol) and a polyvinylpyrrolidone. The poly(vinyl alcohol) and the polyvinyl pyrrolidone are preferably employed in a weight ratio in the range from 0.1 to 10:1, more preferably 0.2 to 5:1, in particular 0.3 to 3:1.

The combination of these two water-soluble synthetic organic polymers leads to specific advantageous properties with regard to vapor and smoke permeability.

Preferably, at least one plastifier is employed in the composition of the at least one layer (1). Preferably, the plastifier is selected from one or more of glycerol, mono- and diglycol, trimethylolpropane, a mono-, di- or triester of glycerol with carboxylic acids, formamide, acetamide, N,N-dimethylformamide or N,N-dimethylacetamide.

The food casing according to the present invention can contain one or more layers (1) of the same or different compositions.

Furthermore, a preferred food casing according to the present invention furthermore comprises at least one second layer (2), comprising a mixture of at least one aliphatic (co) polyamide with at least one water-soluble synthetic organic polymer and no plastifier.

Preferably the aliphatic (co)polyamide is selected from one or more of PA 6, PA 6/66, PA 66, PA 6.8, PA 6.9, PA 6.11, PA 11 and PA 12.

Of the aliphatic (co)polyamides, preference is given to poly(ε-caprolactam), also termed nylon 6, the polyamide of hexamethylenediamine and adipic acid (=poly(hexamethylene adipamide) or nylon 66), the copolyamide of ε-caprolactam and ω-laurolactam (=nylon 6/12) and also nylon 6/66. The copolyamides also include heterofunctional polyamides, in particular polyetheramides, polyesteramides, polyetheresteramides and polyamide urethanes. Among these polymers, preference is given to those having block-type distribution of the various functionalities, i.e. block copolymers. Particularly preferred block copolymers are poly(ether block amides).

The second layer (2) can be free from semi-aromatic (co) polyamides. However, it is also possible that the second layer furthermore comprises a semi-aromatic (co)polyamide.

For the type of semi-aromatic (co)polyamide, reference can be made to the above-mentioned semi-aromatic (co) polyamides.

For the water-soluble synthetic organic polymer, reference can be made to the above-mentioned polymers. In a preferred embodiment, the second layer (2) contains only polyvinylpyrrolidone as water-soluble synthetic organic polymer.

The second layer (2) preferably contains no plastifier.

The proportion of aliphatic (co-)polyamide is generally 40 to 94% by weight, preferably 55 to 90% by weight, particularly preferably 60 to 85% by weight, in each case based on the total weight of the mixture forming layer (2).

The content of the synthetic water-soluble polymer is generally 3 to 50% by weight, preferably 10 to 40% by weight, particularly preferably 15 to 30% by weight, based on the total weight of the thermoplastic mixture forming layer (2).

The sum of the ingredients of the second layer (2) adds up to 100 wt.-%.

The food casings according to the present invention can contain one or more second layers (2) of same or different composition.

The layers of the food casing according to the present invention can contain additives and further ingredients.

If appropriate, the thermoplastic mixture comprises additives which affect the properties of the casing. By this means, properties such as optics, haptics, moisture storage capacity or peeling behavior can be set exactly as desired or as required. For this, in particular polysaccharides, inorganic fillers and color pigments come into question.

Preferred organic additives are polysaccharides. These include starch (native or destructured, in the latter case having plasticizer additives such as glycerol), cellulose (in the form of powders or short fibers, the short fibers being able to be fibers of native origin or fibers produced by viscose spinning), exo-polysaccharides (such as carrageenan, locust bean gum or guar gum) and polysaccharide derivatives (such as crosslinked starch, starch esters, cellulose esters, cellulose ethers or carboxyalkylcellulose ethers).

The inorganic fillers which come into consideration are, in particular, quartz powder, titanium dioxide, calcium carbonate, talcum, mica and other aluminosilicates, glass stable fibers, other mineral fibers or microglass beads. Color pigments can, depending on the desired color, be of organic and/or inorganic nature.

Other components which are expediently present are, for example, the afore-mentioned plasticizer aids, such as glycerol, mono- and diglycols, trimethylolpropane, mono-, di- and triesters of glycerol with carboxylic acids (especially linear ($C_3$-$C_{12}$)-alkanoic acids), formamide, acetamide, N,N-dimethylformamide, N,N-dimethylacetamide, also stabilizers and processing aids.

The content of other substances present if appropriate is generally 0 to 25% by weight, preferably 1 to 20% by weight, particularly preferably 2 to 8% by weight, based on the total weight of the thermoplastic mixture or respective layer. Polysaccharides should be present here in a content of a maximum 5% by weight, in order to keep the water vapor transmission rate within said limits. If amounts of plastifier are individually stated, they are not included in the ranges given here.

The invention also relates to a method for producing the inventive food casing. The production is generally performed by extrusion processes which are known per se to those skilled in the art.

The mixture to be extruded is produced most simply by mechanical mixing of the granular components and subsequent joined melting in the extruder.

In some cases it is expedient first to premix the water-soluble synthetic polymer with one or more plasticizer(s). This premixture can be produced, for example, in a heatable kettle having a high-speed wall-scrapping agitator.

Typically, 100 parts of water-soluble polymer (such as PVAL and/or PVP) are charged in powder form and mixed with 5 to 15 parts of plasticizer (such as glycerol or ethylene glycol) and if appropriate up to 15 parts of water. With continuing stirring, the mixture is heated to 100 to 120[deg] C. and further stirred until uniform distribution of the plasticizer is achieved. After it has cooled, a uniformly fine-grain flowable powder should be present.

This powder can be mixed directly with the remaining components and extruded or else converted in advance to granules. An advantage of the granule form is the better mixability with the further components which are generally likewise present in granular form, and also the easier feed into the extruder. For granule production, suitable systems are commercially conventional twin-shaft kneaders having a pelleting die, air-cooling section and strand pelletizer.

After the mixture forming a layer of the tubular film has melted in the extruder, it is homogenized and jointly plasticized. The melt is then extruded through a ring die. A primary tube forms having a relatively high wall thickness. The primary tube is then rapidly cooled to freeze the amorphous state of the polymers. Then it is reheated to the temperature necessary for stretching, for example to about 80° C. The tube is then stretched in longitudinal and transverse directions, which is preferably carried out in one operation. The longitudinal stretching is customarily performed using two nip-roller pairs having increasing drive speed; the transverse stretching is performed by a gas pressure operating on the walls of the tube from the inside. The area stretching ratio (that is the product of longitudinal and transverse stretching ratio) is generally about 6 to 18, preferably about 8 to 11.

After stretching, the tube is preferably further heat set. This permits the desired shrink properties to be set exactly. Finally, the tube is cooled, laid flat and wound up.

In a particular embodiment, the tube is then made into a ring. For this the tube is inflated, heated on one side (generally without contact by radiant heat) and then bent in the heated state, so that it takes on a ring-shaped or spiral-shaped form. Methods and apparatuses for ring-shaping are generally known to those skilled in the art and also described in the patent literature.

Preferably, the tubular film has a thickness of from 15 to 70 µm, more preferably of from 20 to 60 µm, in particular of from 25 to 45 µm.

Each layer of the film has a preferably a thickness of at least 2 µm, more preferably at least 5 µm, in particular at least 8 µm.

Preferably, the food casing has a water-vapor permeability of from 50 to 300 $g/m^2$ day 23° C. and 85% relative humidity. Under these conditions, the water-vapor permeability is more preferably in the range of from 90 to 250 $g/m^2$ day, in particular in the range of from 145 to 170 $g/m^2$ day.

Preferably, the tubular film according to the present invention comprises 2 to 10 layers, more preferably 3 to 7 layers. The number and sequence of the layers can be chosen according to the actual demands of the specific foodstuff contained in the food casing.

Preferably, the food casing is biaxially oriented and thermosetting.

The combination of such layers with preferred polymers may be schematically represented as follows in 3, 5 or 7 layer structures.

Layer (1):
(1) One semi-aromatic (co)polyamide preferably containing terephthalic acid (T) and/or isophthalic acid (I) in their cyclic structure
(2) Water soluble component such as polyvinyl alcohol (PVOH)
(3) plastifier such as glycerine Layer (2):
(1) aliphatic (co)polyamide
(2) polyvinyl pyrrolidone as hydrophilic compound (PVP)
(3) additives such as silicates, silicium oxides, etc.

Layer (3):
(1) One semi-aromatic (co)polyamide preferably containing terephthalic acid (T) and/or isophthalic acid (I) in their cyclic structure
(2) Water soluble component such as polyvinyl alcohol
(3) plastifier such as glycerine (combined with above Nr. 2)
(4) polyvinyl pyrrolidone as hydrophilic compound The combination of layers (1) and (2) in 3-7 layer structures are aimed at obtaining selective permeability to gas and/or water depending on the sausage type to be produced. For the production of cooked smoked sausages higher smoke/gas permeability at higher temperatures and humidity are needed, so that structures containing more Layer (1) structures will be more predominant. For semi-dry and dry sausages including some raw fermented sausages, Layer (2) structures will be more predominant as higher permeability to water vapor is to be achieved. Balanced layer thicknesses and use of additives to enhance permeability values or haptic appearance is the clue to this invention. Meat adhesion is defined by inner layer properties and presence of key-additives such as silicates. The layer thicknesses may preferably vary from 2 to 15 µm whereby the total casing thickness will preferably range from 20 to 60 µm depending of diameter of casing, type of sausage and used processing technology.

TABLE 1

Chosen practical examples of layer structures to meet requirements of sausage types
Layers A (example of layer (1)) and B (example of layer (2)) can be intermittent or adjacent such as in the following table

| 3-Layer | | 5-Layer | | 7-Layer | |
|---|---|---|---|---|---|
| A/A/B | Cooked smoked | A/A/A/A/B | Cooked smoked | A/A/A/A/A/B | Cooked smoked |
| A/B/A | Cooked smoked | A/A/B/A/A | Cooked smoked | A/A/B/A/A/A/B | Cooked smoked |
| A/B/B | Dry and semi-dry (raw) | A/B/A/B/B | Dry and semi-dry (raw) | A/A/A/B/B/B | Dry and semi-dry (raw) |
| B/A/B | Dry and semi-dry | A/B/B/B/B | Dry and semi-dry | A/B/B/A/B/B/B | Dry and semi-dry |

Above, table 1 gives the combination of layers defined as A and B in 3, 5 and 7-layer structures involving a structure with semi-aromatic polyamide and one water soluble component for some types of cooked and smoked types of sausages and some types of dry and semi-dry sausages.

TABLE 2

Chosen practical examples of Layer structures to meet requirements of sausage types
Layers A (example of layer (1)), B (example of layer (2)) and C (example of layer (3)) can be intermittent or adjacent such as in the following table:

| 3-Layer | | 5-Layer | | 7-Layer | |
|---|---|---|---|---|---|
| A/B/C | Cooked smoked | A/A/A/A/C | Cooked smoked | A/A/A/A/A/C/C | Cooked smoked |
| A/C/B | Cooked smoked | A/A/C/C/C | Cooked smoked | A/A/B/A/C/C/B | Cooked smoked |
| A/B/B | Dry and semi-dry (raw) | A/B/A/B/C | Dry and semi-dry (raw) | A/A/B/A/B/B/C | Dry and semi-dry (raw) |

TABLE 2-continued

Chosen practical examples of Layer structures to meet requirements of sausage types
Layers A (example of layer (1)), B (example of layer (2)) and C (example of layer (3)) can be intermittent or adjacent such as in the following table:

| 3-Layer | | 5-Layer | | 7-Layer | |
|---|---|---|---|---|---|
| B/A/C | Dry and semi-dry | A/B/B/B/C | Dry and semi-dry | A/B/B/A/B/C/C | Dry and semi-dry |

Table 2 shows structures using layers A, B and C in 3, 5 and 7-layer structures which give even more options to interchange permeability to smoke/gases and/or water vapor. The advantages of above mentioned structures are demonstrated in using commercially available polymers and equipment for coextrusion, biaxial orientation and thermo-setting to obtain a multilayer tubular film (casing) of only some of the multilayer structures are shown as follows.

List of some commercially available polymers used in coextrusion of a multilayer tubular film (casing) for described layers (1), (2) and (3):

Semi-aromatic polyamides:
ISO 1874-PA 6/IPDI, FS, 18-020—Durethan C 38 FA, Lanxess
ISO 1874: PA6/PA 6I, FT, 14-020—Durethan CI 31, F, Lanxess
BM 16, EMS-Chemie
BM 17, EMS-Chemie Aliphatic polyamides:
PA 6 (B40 of BASF),
PA 666 (C33 of BASF)
PA 666 (C40 of BASF)

Water soluble components:
Polyvinyl alcohol (PVOH) Mowiflex TC 232, Kuraray (contains glycerine as plastifier)
Polyvinylpyrrolidone (PVP), Polyplasdone XL 10, ISP Additives, colors and other processing aids:
Antiblocking agents, colors, surface enhancers and other similar additives are known and were not the subject of this experiment which focuses on main functional polymers The above mentioned polyamides—either semi-aromatic or aliphatic—were used in blends in order to achieve the required mechanical properties. Water soluble components are PVOH (always with plastifier glycerine) and PVP (always without plastifier).

EXAMPLE 1

A multi-layer tube was coextruded in 3 layers comprising the following components in each from outer to inner layer in this order:
1. 55 wt.-% mixture of two semi-aromatic polyamides PA 6/IPDI (Durethan C38 FA) and PA6/PA 6I (Durethan CI 31) in a ratio of 80:20, blended along with 25 wt.-% of Polyvinyl alcohol (PVOH) Mowiflex TC 232 from Kuraray (containing glycerine as plastifier) and 20% of a semi-aromatic nylon master batch containing Polyvinylpyrrolidone (PVP) Polyplasdone XL 10 from ISP (30 wt.-% PVP+70 wt.-% Durethan C38 FA)
2. 75 wt.-% PA 6.66 (C33 from BASF) and 25 wt.-% of a semi-aromatic nylon master batch containing Polyvinylpyrrolidone (PVP) Polyplasdone XL 10 from ISP (30% PVP+70% Durethan C38 FA)

3. 65 wt.-% mixture of two semi-aromatic polyamides PA 6/IPDI (Durethan C38 FA) and PA6/PA 6I (Durethan CI 31) in a ratio of 80:20 was blended along with 25% of Polyvinyl alcohol (PVOH) Mowiflex TC 232 from Kuraray (containing glycerine as plastifier) and 10% of a semi-aromatic nylon master batch containing Polyvinylpyrrolidone (PVP) Polyplasdone XL 10 from ISP (30% PVP+70% Durethan C38 FA).

The primary tube of above 3 layers was extruded over 3 extruders into a 3-layer coextrusion head to form the primary tube which was water cooled, re-heated, biaxially oriented and thermo-set to stabilize its end dimension. The total thicknesses extruded were: 26, 30 and 34 µm, all layers having approximately the same thickness.

EXAMPLE 2

A multi-layer tube was coextruded in 3 layers comprising the following components in each from outer to inner layer in this order:

1. 55 wt.-% mixture of two semi-aromatic polyamides PA 6/IPDI (Durethan C38 FA) and PA6/PA 6I (Durethan CI 31) in a ratio of 80:20, blended along with 25 wt.-% of Polyvinyl alcohol (PVOH) Mowiflex TC 232 from Kuraray (containing glycerine as plastifier) and 20% of a semi-aromatic nylon master batch containing Polyvinylpyrrolidone (PVP) Polyplasdone XL 10 from ISP (30 wt.-% PVP+70 wt.-% Durethan C38 FA)
2. 75 wt.-% PA 6.66 (C33 from BASF) and 25 wt.-% of a semi-aromatic nylon master batch containing Polyvinylpyrrolidone (PVP) Polyplasdone XL 10 from ISP (30% PVP+70% Durethan C38 FA)
3. 75 wt.-% mixture of two semi-aromatic polyamides PA 6/IPDI (Durethan C38 FA) and PA6/PA 6I (Durethan CI 31) in a ratio of 80:20, blended along with 25% of Polyvinyl alcohol (PVOH) Mowiflex TC 232 from Kuraray (containing glycerine as plastifier).

The primary tube of above 3 layers was extruded over 3 extruders into a 3-layer coextrusion head to form the primary tube which was water cooled, re-heated, biaxially oriented and thermo-set to stabilize its end dimension. The thicknesses extruded were: 26, 30 and 34 µm, all layers having approximately the same thickness.

EXAMPLE 3

A multi-layer tube was coextruded in 3 layers comprising the following components in each from outer to inner layer in this order:

1. 55 wt.-% mixture of two semi-aromatic polyamides PA 6/IPDI (Durethan C38 FA) and PA6/PA 6I (Durethan CI 31) in a ratio of 90:10, blended along with 25 wt.-% of Polyvinyl alcohol (PVOH) Mowiflex TC 232 from Kuraray (containing glycerine as plastifier) and 20% of a semi-aromatic nylon master batch containing Polyvinylpyrrolidone (PVP) Polyplasdone XL 10 from ISP (30 wt.-% PVP+70 wt.-% Durethan C38 FA)
2. 80% of a 50:50 blend of PA 6 (B40 FA from Lanxess) and semi-aromatic nylon PA 6/IPDI (C38 FA from Lanxess) and 20% of a semi-aromatic nylon master batch containing polyvinylpyrrolidone (PVP) Polyplasdone XL 10 from ISP (30% PVP+70% Durethan C38 FA)
3. 65 wt.-% mixture of two semi-aromatic polyamides PA 6/IPDI (Durethan C38 FA) and PA6/PA 6I (Durethan CI 31) in a ratio of 80:20; blended along with 25% of Polyvinyl alcohol (PVOH) Mowiflex TC 232 from Kuraray (containing glycerine as plastifier) and 10% of a semi-aromatic nylon master batch containing Polyvinylpyrrolidone (PVP) Polyplasdone XL 10 from ISP (30% PVP+70% Durethan C38 FA).

The primary tube of above 3 layers was extruded over 3 extruders into a 3-layer coextrusion head to form the primary tube which was water cooled, re-heated, biaxially oriented and thermo-set to stabilize its end dimension. The total thicknesses extruded were: 30, 37 and 43 µm, all layers having approximately the same thickness.

EXAMPLE 4

A multi-layer tube was coextruded in 3 layers comprising the following components in each from outer to inner layer in this order:

1. 55 wt.-% mixture of two semi-aromatic polyamides PA 6/IPDI (Durethan C38 FA) and PA6/PA 6I (Durethan CI 31) in a ratio of 90:10, blended along with 25 wt.-% of Polyvinyl alcohol (PVOH) Mowiflex TC 232 from Kuraray (containing glycerine as plastifier) and 20% of a semi-aromatic nylon master batch containing Polyvinylpyrrolidone (PVP) Polyplasdone XL 10 from ISP (30 wt.-% PVP+70 wt.-% Durethan C38 FA)
2. 80% of PA 6 (B40 FA from Lanxess) 20% of a semi-aromatic nylon master batch containing Polyvinylpyrrolidone (PVP) Polyplasdone XL 10 from ISP (30% PVP+70% Durethan C38 FA)
3. 75 wt.-% mixture of two semi-aromatic polyamides PA 6/IPDI (Durethan C38 FA) and PA6/PA 6I (Durethan CI 31) in a ratio of 80:20, blended along with 25% of Polyvinyl alcohol (PVOH) Mowiflex TC 232 from Kuraray (containing glycerine as plastifier).

The primary tube of above 3 layers was extruded over 3 extruders into a 3-layer coextrusion head to form the primary tube which was water cooled, re-heated, biaxially oriented and thermo-set to stabilize its end dimension. The total thicknesses extruded were: 30, 37 and 43 µm, all layers having approximately the same thickness.

TABLE 3

Water-vapor permeation values of described samples in different thicknesses (26, 30, 34, 37 and 43 µm) according to ISO 15106 (2007) in g/m$^2$/24 h

| | 26 µm | 30 µm | 34 µm | 37 µm | 43 µm |
|---|---|---|---|---|---|
| Example 1 | 160 | 155 | 150 | n.a. | n.a. |
| Example 2 | 170 | 163 | 156 | n.a. | n.a.- |
| Example 3 | n.a. | 167 | n.a. | 157 | 147 |
| Example 4 | n.a. | 162 | n.a. | 155 | 145 |

Test with Different Types of Sausages for Described Samples

EXAMPLES 1 AND 2

Cooked and Smoked Sausages

Casings were shined either in straight form or curved (ringed) and then shirred for filling/twisting or filling/clipping operations in a meat factory. The casing was soaked and/or used dry to withstand pressures of filling/clipping and comparisons were made. The sausages were hung onto smoking/cooking sticks and thermally processed in smoking and cooking chambers and thermally treated at 70° C. core temperature and smoked in 2 intermittent phases each lasting 15 minutes at higher relative humidities to allow smoke penetration. All other processes were kept identical to the processes used with other types of casings such as natural, collagen or cellulose.

Two bigger groups of sausages were made: cooked smoked sausages and semi-dry sausages. Example 1 and 2 were evaluated on cooked and smoked sausages with typical criteria being determined and Examples 3 and 4 were evaluated on semi-dry sausages.

TABLE 4

Evaluation of main characteristics of casings on ready-made smoked and cooked sausages of caliber 32-50 mm (casing structures as per Example 1 and 2)

|  | Example 1 | | | Example 2 | | |
| --- | --- | --- | --- | --- | --- | --- |
|  | 26 µm | 30 µm | 34 µm | 26 µm | 30 µm | 34 µm |
| Ringing ability | 1 | 1 | 2 | 1 | 1 | 2 |
| Cylindricity | 3 | 2 | 1 | 3 | 2 | 1 |
| Twistability | 1 | 2 | 3 | 1 | 2 | 3 |
| Natural optics | 1 | 1 | 1 | 1 | 1 | 1 |
| Natural haptics | 1 | 1 | 1 | 1 | 1 | 1 |
| Peeling | 3 | 3 | 3 | 1 | 1 | 1 |
| Adhesion | 3 | 3 | 4 | 1 | 1 | 2 |
| Smoke color | 2 | 2 | 3 | 1 | 1 | 2 |
| Smoke flavor | 1 | 2 | 2 | 1 | 1 | 2 |

Evaluation description:
(1) excellent,
(2) very good,
(3) satisfactory,
(4) acceptable,
(5) imperfect and
(6) poor or not applicable Table 4 shows results of main 9 chosen characteristics of the innovative casing when judging those on a smoked cooked sausage of German-type as per Articles 2.221.05 and 2.221.06 of the German Guidelines for Meat and Meat products (Leitsätze für Fleisch and Fleischerzeugnisse, Lebensmittelbuch) available online from the German Ministry for Nutrition, Agriculture and Consumer Protection (www.bmelv.de).

The ringing ability (or curvability) is the easiness of processability on separate converting equipment prior to shirring i.e. it is a process which changes the casing from its straight form to a more natural curved form with different inner diameters (100-200 mm). In this example different inner diameters were used to judge and evaluate easiness of the curvability but also required end properties (mechanical stability, shrinkage after curving and other nuances needed to achieve a naturally looking product). Especially thinner gauges of 26 and 30 µm were very easily curvable, looked natural and were later when filling/twisting/clipping of natural appearance. The casing with 34 µm thickness had same end properties but was somehow harder to process, which could have been overcome with somewhat differentiated curving parameters on ringing equipment.

The cylindricity of the sausage was judged on sausages of straight form and even though the thinner casing showed less cylindricity than thicker ones, it was perhaps even more wanted to imitate a natural look with somehow rounded shoulders (radius of sausage ends were more natural and less cylindrical).

Twistability is a property not described in plastic casings but usually for other types of casings such as cellulose, collagen and natural casings. In this test special care was taken to observe this property so important for the so-called linked or twisted sausages on automatic (or half automatic) linking and hanging equipment used nowadays in the meat industry (e.g. Handtmann AL-series of equipment for automatic linking and hanging of twisted sausages). Thinner versions of this innovative casing showed extreme adaptability to the twisting process looking natural and hard to differentiate from natural fabrics. Even thinner versions of casing with 22 µm and 24 µm could have been twisted when the weight of the single portion and chain did not surpass the limits of force needed.

Natural optics and haptics were excellent in all sausages of both versions of example 1 and 2. Matt surface, non-glossiness was the main characteristics and if natural brown, smoke and other colors were used, these appeared as of natural fabrics.

Peeling showed substantial differences between Example 1 and 2 as inner layers had different polymer composition which resulted in higher and lower adhesion thus making the peeling more or less problematic. In Example 1 the adhesion was excessive in the case of mentioned sausage recipe and Example 2 showed moderate adhesion made easy for peeling. Otherwise the removal of casing on the sausage was easier than this is the case with natural or collagen casing for the same type of product.

Adhesion as already described was too high in Example 1 and optimum in Example 2. As explained the sausage recipe will guide the wanted selective adhesion as these vary from product to product, from country to country and in processing technology. Therefore the adhesion found in this sausage recipe might be the opposite in another one of similar appearance and taste but having another water/protein or protein/fat ratio or connective tissue content. The interchangeability of polymers in the inner layer will allow required selection to match different levels of adhesion without changing other properties of the casing.

Smoke color was similar in Example 1 and 2 even though in Example 1 some of the surface smoked crust was removed by peeling (see description of adhesion above) and had therefore lower rating than Example 2. As explained this was an indirect effect caused by removing some of the color with the casing. Therefore the color intensity and appearance after peeling is highly influenced by the casing adhesion.

Smoke flavor was less influenced by peeling away some of the color on the surface of the sausage; this suggests that smoke penetrated even deeper zones than the visible darker yellow to light brown and therefore it seems that smoke taste is evenly distributed in zones which are even a few millimeters deeper than the surface of the sausage.

EXAMPLES 3 AND 4

Smoked Semi-dry Sausages

Semi-dry sausages are smoked and/or thermally treated to a lower extent in the smokehouse, which occasionally reaches nearly 60° C. for a strictly limited time. After smoking, the sausages may be air dried for a relatively short time. Compared with dry sausages, these products show higher water activity values (>0.90-0.91), so that a lower pH is needed for satisfactory protection against undesired microorganisms (Handbook of meat processing, Chapter 22, Semidry and Dry Fermented Sausages by Vignolo, Fontana and Fadda, p. 380, Wiley online Library Published Online: 23 FEB 2010).

A semi-dry sausage was produced in trials with casings of our Example 3 and 4. The thermal treatment was achieved at 58° C. combined with an initial smoking process at higher humidity (over 90% r.h.). From this point fermentation took place (25° C.) and finally drying (16° C.) to achieve a stable product after 8 days of in cal. 55 mm of the innovative casing.

TABLE 5

Evaluation of main characteristics of casings on ready-made smoked and thermally treated semi-dry sausages of caliber 55 mm (casing structures as per Example 3 and 4)

|  | Example 3 | | | Example 4 | | |
| --- | --- | --- | --- | --- | --- | --- |
|  | 30 μm | 37 μm | 43 μm | 30 μm | 37 μm | 43 μm |
| Ringing ability | 2 | 3 | 4 | 2 | 3 | 4 |
| Cylindrical shape | 2 | 2 | 1 | 2 | 2 | 1 |
| Twistability | 6 | 6 | 6 | 6 | 6 | 6 |
| Natural optics | 2 | 2 | 2 | 2 | 2 | 2 |
| Natural haptics | 2 | 2 | 1 | 2 | 2 | 1 |
| Peeling | 2 | 3 | 4 | 2 | 2 | 3 |
| Adhesion | 3 | 3 | 4 | 2 | 2 | 2 |
| Smoke color | 2 | 3 | 4 | 2 | 3 | 4 |
| Smoke flavor | 2 | 2 | 3 | 2 | 2 | 3 |

Evaluation description:
(1) excellent,
(2) very good,
(3) satisfactory,
(4) acceptable,
(5) imperfect and
(6) poor or not applicable The ringing ability of examples 3 and 4 were quite different from examples 1 and 2. Especially thinner gauges of 30 and 37 μm were curvable, looked natural and were later when filling/twisting/clipping of natural appearance. The casing with 43 μm was harder to curve, which could have been overcome with higher temperatures of ringing and differentiated curving parameters on ringing equipment. Inner ring diameters were more limited than in Examples 1 and 2.

The cylindricity of the sausage was judged on sausages of straight form and even though the thinner casing showed less cylindricity than thicker ones, all 3 thickness executions were cylindrical with symmetrical shoulders and regular shape with sausage weights from 400-1500 g.

Twistability was not given at all with this casing structure but clipping with conventional automatic double clipping equipment was on the other hand very good and a pre-requisite for a casing. These casing structures are not suitable for twisting or linking processes—not even in its 30 μm execution.

Natural optics and haptics were excellent in all sausages of both versions of example 3 and 4. Matt surface, non-glossiness were the main characteristics and if natural brown, smoke and other colors were used, these appeared as of natural fabrics.

Peeling did not show substantial but some differences between Example 3 and 4 as inner layers were visible; the inner layer had different polymer composition which resulted in higher and lower adhesion thus making the peeling more or less problematic. In Example 3 the adhesion was excessive in the case of mentioned sausage recipe and Example 2 showed moderate adhesion made easy for peeling. Otherwise the removal of casing on the sausage was easier than this is the case with natural or collagen casing for the same type of product.

Adhesion as already described was too high in Example 3 and nearly optimum in example 4. As explained the sausage recipe will guide the wanted selective adhesion as these vary from product to product, from country to country and in processing technology. In semi-dry sausages often the fat level is high resulting in low adhesion to standard inner layers so that higher adhesion exerted by semi-aromatic polyamides in combination with water soluble polymers, showed useful. Similarly as in examples 1 and 2, the interchangeability of polymers in the inner layer will allow required selection to match different levels of adhesion without changing other properties of the casing.

Smoke color was similar in example 3 and 4 even though in example 3 some of the surface smoked crust was removed by peeling (see description of adhesion above) and had therefore lower rating than example 4. As explained this was an indirect effect by removing some of the color with the casing.

Smoke flavor was less influenced by peeling away some of the color on the surface of the sausage; this suggests that smoke penetrated even deeper zones in semi-dry products similarly to cooked ones.

The invention claimed is:

1. A tubular film food casing, which is semi-permeable to smoke and water-vapor, comprising at least one layer (1), comprising a mixture of at least one semi-aromatic (co)polyamide with at least one water-soluble synthetic organic polymer and optionally at least one plastifier,
   wherein the tubular film food casing comprises 2 to 10 layers,
   wherein the at least one layer (1) comprises at least two different water-soluble synthetic organic polymers, and
   wherein the at least one layer (1) comprises a partially or completely saponified poly(vinyl alcohol) and a polyvinylpyrrolidone.

2. The food casing as claimed in claim 1, which is biaxially oriented and thermosetting.

3. The food casing as claimed in claim 1, wherein the water-soluble, synthetic, organic polymer is
   (i) a partially or completely saponified poly(vinyl alcohol),
   (ii) a copolymer having vinyl alcohol units,
   (iii) a poly(alkylene glycol),
   (iv) a copolymer having alkylene glycol units,
   (v) a polyvinylpyrrolidone,
   (vi) a copolymer having vinylpyrrolidone units and units of at least one $\alpha,\beta$-olefinically unsaturated monomer,
   (vii) a homopolymer or a copolymer having units of N-vinylalkylamides and/or
   (viii) a (co)polymer of or polymer having units of $\alpha,\beta$-unsaturated carboxylic acids or $\alpha,\beta$-unsaturated carboxamides.

4. The food casing as claimed in claim 1, wherein the at least one layer (1) does not comprise aliphatic (co)polyamides.

5. The food casing as claimed in claim 1, wherein the at least one layer (1) comprises a plastifier which is selected from one or more of glycerol, mono- and diglycol, trimethylolpropane, a mono-, di- or triester of glycerol with carboxylic acids, formamide, acetamide, N,N-dimethylformamide or N,N-dimethylacetamide.

6. The food casing as claimed in claim 1, wherein the semi-aromatic (co)polyamide comprises units derived from isophthalic acid and/or terephthalic acid.

7. The food casing as claimed in claim 1, which comprises at least one second layer (2), comprising a mixture of at least one aliphatic (co)polyamide with at least one water-soluble synthetic organic polymer and no plastifier.

8. The food casing as claimed in claim 7, wherein the aliphatic (co)polyamide is selected from one or more of PA 6, PA 6/66, PA 66, PA 6.8, PA 6.9, PA 6.11, PA 11 and PA 12.

9. The food casing as claimed in claim 7, wherein the second layer (2) furthermore comprises a semi-aromatic (co)polyamide.

10. The food casing as claimed in claim 1, wherein the tubular film has a thickness of from 15 to 70 μm and each layer of the film has a thickness of at least 2 μm.

11. The food casing as claimed in claim 1, wherein the food casing has a water-vapor permeability of from 50 to 300 g/m$^2$ day at 23° C. and 85% relative humidity.

12. A process for producing a tubular film food casing as claimed in claim 1, by (co)extruding the mixtures forming the at least one layer (1) and optionally further layers.

13. A food product, comprising a tubular film food casing as defined in claim 1, filled with a solid or paste-like food stuff.

14. The food product as claimed in claim 13, wherein the foodstuff is selected from sausages, cheese and spreadable foodstuff.

* * * * *